(12) United States Patent  
Becker et al.

(10) Patent No.: US 7,863,338 B2
(45) Date of Patent: Jan. 4, 2011

(54) ABSORBENT POLYMER GRANULATE (75) Inventors: Volker Becker, Dinslaken (DE); Heinz-Peter Grupe, Krefeld (DE); Detlef Jung, Tönisvorst (DE); Armin Reimann, Willich (DE)

(73) Assignee: Evonik Stockhausen GmbH, Krefeld (DE)

( * ) Notice: Subject to any disclaimer, the term of this patent is extended or adjusted under 35 U.S.C. 154(b) by 0 days.

(21) Appl. No.: 12/762,779

(22) Filed: Apr. 19, 2010

(65) Prior Publication Data

US 2010/0216938 A1    Aug. 26, 2010

Related U.S. Application Data (63) Continuation of application No. 11/578,918, filed as application No. PCT/EP2005/004228 on Apr. 20, 2005, now Pat. No. 7,728,045.

(30) Foreign Application Priority Data

Apr. 21, 2004  (DE) ...................... 10 2004 019 264

(51) Int. Cl.
- B29B 9/00 (2006.01)
- C08F 6/06 (2006.01)
- C08J 3/12 (2006.01)
- B01J 20/26 (2006.01)

(52) U.S. Cl. .......................... 516/99; 34/364
(58) Field of Classification Search ................... 516/99; 34/384
See application file for complete search history.

(56) References Cited

U.S. PATENT DOCUMENTS

| | | | |
|---|---|---|---|
| 4,076,663 A | 2/1978 | Masuda et al. | |
| 4,179,367 A | 12/1979 | Barthell et al. | |
| 4,286,082 A | 8/1981 | Tsubakimoto et al. | |
| 4,339,373 A | 7/1982 | Robinson | |
| 4,587,308 A | 5/1986 | Makita et al. | |
| 5,005,771 A * | 4/1991 | Pieh et al. .................. | 241/23 |
| 5,409,771 A | 4/1995 | Dahmen et al. | |
| 5,519,948 A | 5/1996 | Raehse et al. | |
| 5,562,646 A | 10/1996 | Goldman et al. | |
| 5,597,873 A * | 1/1997 | Chambers et al. ......... | 525/330.1 |
| 5,610,220 A | 3/1997 | Klimmek et al. | |
| 5,672,633 A | 9/1997 | Brehm et al. | |
| 5,712,316 A | 1/1998 | Dahmen et al. | |
| 6,187,902 B1 * | 2/2001 | Yanase et al. ............... | 528/503 |
| 6,291,636 B1 * | 9/2001 | Miyake et al. ........... | 528/502 C |
| 7,541,395 B2 | 6/2009 | Reimann et al. | |
| 2004/0143988 A1 | 7/2004 | Stanek et al. | |
| 2009/0105389 A1 | 4/2009 | Walden et al. | |
| 2009/0227741 A1 | 9/2009 | Walden et al. | |

FOREIGN PATENT DOCUMENTS

| | | |
|---|---|---|
| CA | 2426802 | 4/2003 |
| DE | 2706135 | 8/1978 |
| DE | 3503458 | 8/1985 |
| DE | 4020780 | 8/1991 |
| DE | 4206521 A1 | 9/1993 |
| DE | 4244548 | 7/1994 |
| DE | 4418818 | 1/1995 |
| DE | 4333056 | 3/1995 |
| DE | 10052966 A1 | 5/2002 |
| DE | 10223060 A1 | 12/2003 |
| EP | 0380931 | 8/1990 |
| EP | 0397882 B1 | 11/1990 |
| EP | 0926162 A1 | 6/1999 |
| EP | 0948997 A2 | 10/1999 |
| EP | 1178059 A2 | 2/2002 |
| EP | 1367081 A1 | 12/2003 |
| EP | 1440986 A1 | 7/2004 |
| JP | A-6-107800 | 4/1994 |
| JP | 08073518 A | 3/1996 |
| JP | A-8-134134 | 5/1996 |
| JP | A-8-143680 | 6/1996 |
| WO | 9527739 | 10/1995 |
| WO | 9934843 | 7/1999 |
| WO | 02066543 A1 | 8/2002 |
| WO | 03051939 A1 | 6/2003 |

OTHER PUBLICATIONS

Edana: "Recommended Test Method: Superabsorbent materials—Polyacrylate superabsorbent powders—Gravimetric Determination of Density," copyright 1999.

* cited by examiner

*Primary Examiner*—Kelechi C Egwim
(74) *Attorney, Agent, or Firm*—Smith Moore Leatherwood LLP (57) ABSTRACT

Absorbent polymer granulate comprising the following process steps: i) polymerization of an aqueous monomer solution to obtain a polymer gel; ii) comminution of the polymer gel to obtain a gel granulate; and iii) drying of the gel granulate, and is characterized in that the gel granulate after step ii) has a spread behavior. The production process of an absorbent polymer distinguishes itself by a particularly efficient drying step iii), which enables a particularly gentle and uniform drying of the gel granulate. The obtained absorbent polymers and products and items produced therefrom have a particularly uniform product quality and constant physical-chemical properties.

13 Claims, 6 Drawing Sheets

ABSORBENT POLYMER GRANULATE

This application is a continuation of U.S. application Ser. No. 11/578,918, filed Jul. 6, 2007, now U.S. Pat. No. 7,728,045, which is a national stage application under 35 U.S.C. 371 of international application No. PCT/EP2005/004228 filed Apr. 20, 2005, which claims priority to German Application No. DE 10 2004 019 264.2 filed Apr. 21, 2004, the disclosures of which are expressly incorporated herein by reference.

The invention relates to a process for the production of an absorbent polymer, an absorbent polymer, a composite, a process for the production of a composite, chemical products comprising an absorbent polymer, a use of an absorbent polymer and of a composite, and a device for comminuting and drying of a polymer as well as a polymerization device.

For a formation of so-called "absorbent" polymers, a polymerization of various types of normally water-soluble monomers, often also together with water-insoluble co-monomers in the presence of crosslinkers is necessary. The addition of the crosslinkers occurs during or after the polymerization. Absorbent polymers of this type are lightly crosslinked, water-insoluble hydrogel polymers, which have a high capacity for water absorption in the dry and in the substantially water-free state. This can comprise a multiple of their own weight. By reason of the high absorption capacity, absorbent polymers are suitable for incorporation into water-absorbing structures and objects, such as, e.g. baby diapers, incontinence products or sanitary napkins These absorbent polymers are also described as "superabsorbers" in the literature. In this context, reference is made to Modern Superabsorbent Polymer Technology; F. L. Buchholz, A. T. Graham, Wiley-VCH, 1998.

The production of polymers of this type occurs in the presence of solvents, such as water, so that a drying step for drying of the obtained polymer gel is necessary. The type and method of drying has a significant influence on the microscopic structure and the physical and chemical properties of the polymer produced, so that particular care in the drying of the polymer is required.

The drying step represents a cost-intensive process step, because the water must be removed from the polymer against osmotic capillary forces and forces caused by dipole-dipole interactions and hydrogen bridging bonds as well as adhesion forces. Commonly, a polymer to be dried will be comminuted into a gel granulate, transferred as a layer onto a perforated belt and dried by means of a stream of air.

An increase in the efficiency of the drying effects a significant cost saving. On the other hand, the efficiency in the drying cannot occur at the expense of a gentle and uniform drying. Previously known drying processes often had the disadvantage that they led to an inhomogeneous drying because of the variations in the thickness of the layer of gel granulate to be dried and/or because of variations on the density of the gel granulate within the layer. An inhomogeneous drying has a disadvantageous effect on the product quality and the absorption properties of the absorbent polymer and of the further processing products containing this polymer, e.g. hygiene articles of all types. Furthermore, an inhomogeneous drying of the gel granulate leads to unsatisfactorily dried and therefore viscous gel granulate remaining adhered to the surfaces of the pulverization device connected following the drying device, which frequently leads to downtime of the pulverization device.

Furthermore, an inappropriate drying leads to caking of the particles of the polymer to be dried accompanied by formation of a cake Inhomogeneities of this cake result in an uneven drying and the formation of very solid areas in this cake, through which air can pass only with difficulty. These areas must be further broken up, with significant mechanical stress on the polymer. A significant and undesirable formation of dust is associated herewith.

To solve these problems, JP 08/73518 proposes the continuous determination of the thickness of the gel layer on a belt dryer and the adaptation of the drying conditions to the thickness of the gel layer. U.S. Pat. No. 6,291,636 B1 proposes the separation of insufficiently dried granulate in a separation step occurring before the pulverization step.

The separation of insufficiently dried granulate proposed in U.S. Pat. No. 6,291,636 B1 is avoided according to the teaching of WO 03/051939 A1, by adding a minimum amount of furfural to the acrylic acid used in the polymerization. This process is, however, disadvantageous, since furfural does not only work as a polymerization inhibitor, but is also toxic, which is particularly questionable for the use of the polymers in hygiene articles.

In general, the present invention overcomes the disadvantages arising from the state of the art.

In one aspect of the present invention, a process is provided according to which absorbent polymers can be produced, whereby a particularly efficient and uniform drying of the gel material obtained as intermediate product is effected. This process should lead in as few process steps as possible to superabsorbent polymers with uniform quality and with an amount as small as possible of toxicological impurities.

In another aspect of the present invention, a process is provided according to which absorbent polymers or composites comprising polymers of this type can be produced, whereby the absorbent polymers have a particularly uniform quality and physical-chemical properties corresponding to their use, in particular absorbent properties.

In an additional aspect of the present invention, an absorbent polymer, composites which comprise absorbent polymers of this type and chemical products which comprise absorbent polymers of this type, which have particularly uniform physical-chemical properties and minimum toxicological impurities, are provided.

In yet another aspect of the present invention, a device is provided with which absorbent polymers with particularly uniform physical properties can be prepared cost-effectively.

In a further aspect of the present invention, the mechanical stress of the further processing devices connected following the polymerization reactor is reduced, in order to reduce the probability of their breakdown and to prolong their length of operation.

Additionally, one aspect of the present invention lies in the provision of a superabsorbent polymer which can be incorporated particularly well into hygiene articles, which influences advantageously the absorbent properties of the hygiene articles and which is characterized by a small loading of toxicological impurities.

These aspects of the present invention are provided by the process for producing an absorbent polymer, by the absorbent polymer, by the composite comprising the absorbent polymer, by the process for producing a composite, by the chemical products comprising the absorbent polymer or the composite, by the use of the absorbent polymer, by the device for comminuting and drying a polymer and by the polymerization device, as given in the respective independent claims. Advantageous embodiments and further developments, which can appear individually or in combination, are the object of the respective dependent claims.

The process according to the invention for production of an absorbent polymer comprises the process step i) polymerization of an aqueous monomer solution to obtain a polymer gel, ii) comminution of the polymer gel to obtain a gel granulate, iii) drying of the gel granulate, and is characterized in that the gel granulate after step ii), for example, after step ii) and before the start of step iii) or after step ii) and during step iii) or after step ii) and before and during step iii), such as at a time, at which the gel granulate still has a water content between about 20 and about 90 wt. %, such as between about 40 and about 70 wt. % and such as between about 45 and about 65% and such as between about 50 and about 60%, respectively based on the total weight of the gel granulate, and a temperature $T_{GP}$ (GP=gel particle) within a range of about 20° C. to about 150° C., such as within a range from about 30° C. to about 100° C., such as within a range from about 40° C. to about 80° C. and most such as within a range from about 50° C. to about 70° C., has a spread behavior according to the herein described test methods.

The start of step iii) is any point in time during the course of the production of the absorbent polymers at which the polymer gel obtained after the polymerization, after the comminution is heated, for example, by conduction of energy in the form of heat or in the form of radiation, such as IR-radiation, to a temperature of about 60° C., at least about 100° C. in another aspect and at least about 150° C. in an additional aspect, for example, heated so that a continuous reduction of the water content of the polymer and thereby a drying of the same is enabled.

The spread behavior is the attempt of the gel granulates to equilibrate layer thickness variations. In this respect, not only gravitational forces but also elastic forces have an effect. For example, if the gel granulate is carried on a horizontal surface, the gel granulate distributes itself on this surface, whereby it displaces the tendency to equilibrate troughs and peaks and to effect a leveling of the gel granulate. The elastic forces drive the gel granulate apart and the individual gel granulate particles attempt mechanically to relax. If gel granulate particles have mechanically relaxed, they behave like known gel granulates. The elastic forces of the gel granulate particles lend the gel granulate a living character.

The drying is simplified by the spread behaviour of the gel granulate, since it leads to a more even layer thickness. If, for example, a gel granulate of this type is shaken for drying from a fall height between about 20 cm and about 80 cm, such as with a fall height between about 30 cm and about 50 cm, onto a drying belt (belt dryer), the spread behaviour of the gel granulate advantageously leads to the variations of the layer thickness of the gel granulate on the drying belt (average layer thickness on the drying belt lies between about 5 cm and about 20 cm, in particular between about 10 cm and about 15 cm) amounting to less than about 30%, such as less than 20%, and such as less than 10%. A variation of, for example, less than about 10% means that the height of the gel at the position with the smallest thickness of the gel deviates by less than about 10% from the height of the gel at the position with the largest thickness of the gel. By means of this equilibration of the layer thickness, the gel granulate can be dried particularly uniformly.

Gel granulates of an absorbent polymer which commonly have a water content between about 20 wt % and about 90 wt %, such as between about 40 and about 70 wt. %, such as between about 45 and about 65 wt. % and such as between about 50 wt % and about 60 wt % after the polymerization, can be dried particularly efficiently because of the levelling effect of the spreading. The thus dried absorbent polymer has particularly even physical-chemical properties.

In one embodiment of the process according to the invention, at least one, and in one aspect, all of the following characteristics are present:

a. the polymer gel is mechanically loosened after the comminution in step ii) in the form of the gel granulate obtained after the comminution and before the previously described start of the drying step iii) and a loosened gel granulate is obtained, whereby the loosened gel granulate has a spread behaviour determined according to the herein described test methods;

b. the polymer gel is first mechanically loosened during the drying step iii), for example after at least about 5 wt %, such as at least about 10 wt %, such as at least about 20 wt % and such as at least about 30 wt % of the water contained in the polymer gel before the start of the drying step iii) is evaporated, and a loosened gel granulate is obtained, whereby the loosened gel granulate has a spread behaviour according to the herein described test method.

The above described loosening of the gel granulate in the embodiments a. and b. occurs, for example, at a time at which the gel granules still have the first cited water quantity and the first cited temperature.

The loosening of the gel granulate occurs thus either before or during the drying step iii). It is also possible to loosen the gel granulate before and during the drying process. The spread behaviour of the gel granulate is here caused by the mechanical loosening. The loosening leads to a reduced bulk density of the undried gel granulate determined according to ERT 460.1-99, of less than about 800 g/l in one aspect, less than about 750 g/l in another aspect, less than about 700 g/l in a further aspect, less than about 650 g/l in an additional aspect, and less than about 600 g/l in yet a further aspect. In one embodiment, the bulk density of the undried granulate decreases in the cause of the loosening by at least about 1%, such as at least about 5%, such as at least about 10%, such as by at least about 20% and such as at least about 30%. In another embodiment of the process according to the invention the bulk density of the undried gel granulate decreases by means of the loosening by about 10% to about 50%, for example, by about 20% to about 30%. In this context, a reduction of the bulk density of, for example, about 5%, means that the bulk density of the undried granulate after the loosening is smaller by at least about 5% than the bulk density before the loosening. In one particular embodiment of the process according to the invention, a reduction of the bulk density lies within a range from about 10% to about 50%, such as within a range from about 20% to about 40%.

In a further embodiment of the drying process according to the invention, the spread behaviour of the gel granulate or of the loosened gel granulate, after step ii), such as after step ii) and before the start of step iii) or after step ii) and during step iii), or after step ii) and before and during step iii), such as at a time at which the gel granulate still has the first mentioned water quantity and temperature, is characterized by at least one, such as each of the following characteristics (δ1) to (δ4):

(δ1) A first compressibility index $\kappa_1$ of the gel granulate lies between about 10% and about 40%, such as between about 15% and about 30%, such as between about 18% and about 25%;

(δ2) a second compressibility index $\kappa_2$ of the gel granulate lies between about $3 \times 10^{-5}$ $Pa^{-1}$ and about $6 \times 10^{-5}$ $Pa^{-1}$, such as between about $3.5 \times 10^{-5}$ $Pa^{-1}$ and about $5 \times 10^{-5}$ $Pa^{-1}$, such as between about $3.9 \times 10^{-5}$ $Pa^{-1}$ and about $4.3 \times 10^{-5}$ $Pa^{-1}$;

(δ3) a first decompressibility index $\kappa_1'$ of the gel granulate lies between about 3% and about 15%, such as between about 4 and about 10%, such as between about 5% and about 8%;

(δ4) a second decompressibility index $\kappa_2'$ of the gel granulate lies between about $3 \times 10^{-5}$ $Pa^{-1}$ and about $7 \times 10^{-5}$ $Pa^{-1}$, such as between about $4 \times 10^{-5}$ $Pa^{-1}$ and about $8 \times 10^{-5}$ $Pa^{-1}$, such as between about $5 \times 10^{-5}$ $Pa^{-1}$ and about $6.5 \times 10^{-5}$ $Pa^{-1}$.

Each of the above features represents further embodiments according to the invention. Some exemplary combinations of figures include: δ1δ2δ3, δ1δ2δ4, δ1δ3δ4, δ1δ2, δ1δ3, δ1δ4, δ2δ3, δ2δ4, δ3δ4, δ1, δ2, δ3, δ4, δ1δ2δ3δ4, particularly, δ1δ2δ3δ4.

The spread behavior which is advantageous for the drying of the gel granulate is described by such compressibility and decompressibility indices.

In a further embodiment of the process according to the invention, the gel granulate, after step ii), such as after step ii) and before the start of step iii) or after step ii) and during step iii) or after step ii) and before and during step iii), such as at a point at which the gel granulate still has the first mentioned water quantity and temperature, has at least one of the following properties:

(ε1) a cross section spread index Q determined according to the herein described test method under a load with a total mass of about 1185 g of at least about 3, such as at least about 5, such as at least about 7, such as at least about 7.5 and such as at least about 7.82, whereby the cross section spread index Q may be smaller than about 20;

(ε2) a cross section spread index Q determined according to the herein described test methods under a load with a total mass of about 2175 g of at least about 3, such as at least about 5, such as at least about 7, such as at least about 7.5 and such as at least about 7.56, whereby the cross section spread index Q may be smaller than about 20;

(ε3) a cross section spread index Q determined according to the herein described test method under a load with a total mass of about 3185 g of at least about 3, such as at least about 5, such as at least about 6, such as at least about 7 and yet such as at least about 7.23, whereby the cross section spread index Q is may be smaller than about 20;

(ε4) a cross section spread index Q determined according to the herein described test methods under a load with a total mass of about 6185 g of at least about 3, such as at least about 4, such as at least about 5, such as at least about 6 and such as at least about 6.57, whereby the cross section spread index Q is may be smaller than about 20.

Each of the above features further represents an embodiment according to the invention. The following are exemplary combinations of figures: ε1ε2ε3, ε1ε2ε4, ε1ε3ε4, ε1ε2, ε1ε3, ε1ε4, ε2ε3, ε2ε4, ε3ε4, ε1, ε2, ε3, ε4, ε1ε2ε3ε4, particularly, ε1ε2ε3ε4.

In one embodiment of the process according to the invention, the gel granulate has, after step ii), such as after step ii) and before the start of step iii) or after step ii) and during step iii) or after step ii) and before and during step iii), such as at a point at which the gel granulate still has the first mentioned water quantity and temperature, a spread time constant τ, determined according to the herein described test method under a load with a total mass of about 6185 g, of at least about 2 s, such as at least about 4 s, such as at least about 6 s and such as at least about 10 s. In one aspect, the spread time constant τ does not exceed a value of about 60 s.

The first $\kappa_1$ and the second $\kappa_2$ compressibility index respectively of the gel granulate, as well as the first $\kappa_1'$ and the second $\kappa_2'$ decompressibility index respectively of the gel granulate are defined by compression and decompression experiments described under test methods. The determination of the cross section spread index Q and of the spread time constant τ is also given in the test methods.

Advantageously, the gel is subjected in process step ii) to an at least three-step comminution with a cutting unit, such as a knife, for cutting the gel into flat gel strips, such as with a length within the range of about 5 mm to about 50 mm, such as from about 8 mm to about 40 mm and such as from about 10 mm to about 30 mm, a height within the range from about 1 mm to about 30 mm, such as from about 5 mm to about 25 mm and such as from about 10 mm to about 20 mm as well as a width within the range from about 1 mm to about 40 mm, such as from about 5 mm to about 30 mm and such as from about 10 mm to about 20 mm;

with a shredding unit, such as a breaker, for shredding the gel strips into gel pieces, such as with a length within the range of about 2.5 mm to about 25 mm, such as from about 1 mm to about 12.5 mm, a height within the range from about 0.5 mm to about 15 mm, such as from about 0.25 mm to about 7.5 mm as well as a width within the range from about 0.5 mm to about 20 mm, such as from about 0.25 mm to about 10 mm and a "wolf" (grinding) unit, such as a wolf, having a screw and a hole plate for example, whereby the screw conveys against the hole plate in order to grind and crush gel pieces into gel parts which are in one aspect smaller than the gel pieces.

An optimal surface-volume ratio is achieved hereby, which has an advantageous effect on the drying behaviour. A gel which has been comminuted in this way is particularly suited to belt drying. The three-step comminution offers a better "airability" because of the air channels located between the granulate kernels.

In an additional aspect of the present invention, the gel granulate obtained after step ii) in the process according to the invention comprises to at least about 10 wt %, such as at least about 20 wt % and such as at least about 30 wt %, respectively based upon the total weight of the gel granulate, an absorbent polymer based on:

(α1) about 0.1 wt % to about 99.999 wt %, such as about 20 wt % to about 97.98 wt % and such as about 60 wt % to about 93.95 wt % of polymerized, ethylenically unsaturated, acidic groups-comprising monomers or salts thereof, or polymerized, ethylenically unsaturated monomers comprising a protonated or a quaternary nitrogen, or mixtures thereof, wherein mixtures comprising at least ethylenically unsaturated, acidic groups-comprising monomers, such as acrylic acid, are utilized, (α2) 0 wt % to about 70 wt %, such as about 1 wt % to about 60 wt % and such as about 1 wt % to about 40 wt % of polymerized, ethylenically unsaturated monomers which can be co-polymerized with (α1), (α3) about 0.001 wt % to about 10 wt %, such as about 0.01 wt % to about 7 wt % and such as about 0.05 wt % to about 5 wt % of one or more cross-linkers, (α4) 0 wt % to about 30 wt %, such as about 1 wt % to about 20 wt % and such as about 5 wt % to about 10 wt % of water-soluble polymers, as well as (α5) 0 wt % to about 20 wt %, such as about 0.01 wt % to about 7 wt % and such as about 0.05 wt % to about 5 wt % of one or more auxiliaries, respectively based on the dry absorbent polymer, wherein the sum of the component weights (α1) to (α5) amounts to 100 wt %.

The gel granulate commonly comprises water in a significant amount, since the absorbent polymer is obtained from an aqueous monomer solution, which, for example, comprises water within the range from about 90 wt % to about 50 wt %, such as within the range from about 88 wt % to about 55 wt % and such as within the range from about 70 wt % to about 60 wt % water, respectively based on the total aqueous monomer solution.

The monoethylenically unsaturated, acid groups-comprising monomers (α1) can be partially or fully, particularly, partially neutralized. In one aspect, the monoethylenically unsaturated, acid groups-comprising monomers are neutralized to at least about 25 mol %, such as at least about 50 mol % and such as to about 50 mol % to about 90 mol %. The neutralization of the monomers (α1) can occur before and also after the polymerization. Further, the neutralization can occur with alkali metal hydroxides, alkaline earth metal hydroxides, ammonia as well as carbonates and bicarbonates. In addition, every further base is conceivable which forms a water-soluble salt with the acid. A mixed neutralization with different bases is also conceivable. In one aspect, neutralization with ammonia or with alkali metal hydroxides occurs, such as with sodium hydroxide or with ammonia.

Furthermore, in a polymer the free acid groups may predominate, so that this polymer has a pH value lying in the acidic range. This acidic water-absorbing polymer may be at least partially neutralized by a polymer with free basic groups, such as amine groups, which polymer is basic compared to the acidic polymer. These polymers are termed "mixed-bed ion-exchange absorbent polymers" (MBIEA polymers) in the literature and are disclosed in WO 99/34843. The disclosure of WO 99/34843 is introduced here by way of reference. As a rule MBIEA polymers represent a composition that contain on the one hand basic polymers that are able to exchange anions, and on the other hand contain a polymer that is acidic compared to the basic polymer and that is able to exchange cations. The basic polymer has basic groups and is typically obtained by the polymerization of monomers that carry basic groups or groups that can be converted into basic groups. These monomers are above all those that have primary, secondary or tertiary amines or the corresponding phosphines or at least two of the aforementioned functional groups. This group of monomers includes in particular ethyleneamine, allylamine, diallylamine, 4-aminobutene, alkyloxycyclene, vinylformamide, 5-aminopentene, carbodiimide, formaldacin, melanin and the like, as well as their secondary or tertiary amine derivatives.

The disclosures of DE 102 23 060 A1, in particular with respect to the monomers (α1) and (α2), the crosslinkers (α3) as well as in respect of the initiator and initiator quantities employed are referred to herein.

Monoethylenically unsaturated, acid groups-containing monomers (α1) are cited in DE 102 23 060 A1 as monomers (α1), such as acrylic acid.

In another aspect of the present invention, the absorbent polymer comprises carboxylate group-containing monomers to at least about 50 wt %, such as at least about 70 wt % and such as at least about 90 wt %, based on the dry weight. According to another aspect of the invention, that the absorbent polymer is formed from at least about 50 wt %, such as at least about 70 wt % of acrylic acid, which is neutralized, for example, to at least about 20 mol %, such as at least about 50 mol %.

Monoethylenically unsaturated monomers (α2) which are copolymerizable with (α1) are utilized, which are cited in DE 102 23 060 A1 as monomers (α2), such as acrylamide.

Exemplary cross-linkers (α3) according to the invention are compounds which have at least two ethylenically unsaturated groups in one molecule (cross-linker class I), compounds which have at least two functional groups which can react with functional groups of the monomers (α1) or (α2) in a condensation reaction (=condensation cross-linkers), in an addition reaction or a ring-opening reaction (cross-linker class II), compounds which have at least one ethylenically unsaturated group and at least one functional group which can react with functional groups of the monomers (α1) or (α2) in a condensation reaction, an addition reaction or a ring-opening reaction (cross-linker class III), or polyvalent metal cations (cross-linker class IV). Thus with the compounds of cross-linker class I a cross-linking of the polymer is achieved by radical polymerization of the ethylenically unsaturated groups of the cross-linker molecules with the monoethylenically unsaturated monomers (α1) or (α2), while with the compounds of cross-linker class II and the polyvalent metal cations of cross-linker class IV a cross-linking of the polymer is achieved respectively via condensation reaction of the functional groups (cross-linker class II) or via electrostatic interaction of the polyvalent metal cation (cross-linker class IV) with the functional groups of the monomer (α1) or (α2). With compounds of cross-linker class III a cross-linking of the polymers is achieved correspondingly by radical polymerization of the ethylenically unsaturated groups or also by condensation reaction between the functional groups of the cross-linkers and the functional groups of the monomers (α1) or (α2).

Exemplary crosslinkers (α3) are all those compounds which are cited in DE 102 23 060 A1 as crosslinkers (α3) of the crosslinker classes I, II, III and IV, whereby
  as compounds of crosslinker class I, N,N'-methylene bisacrylamide, polyethyleneglycol di(meth)acrylates, triallylmethylammonium chloride, tetraallylammonium chloride and allylpolyethyleneglycol acrylate produced with 9 mol ethylene oxide per mol acrylic acid may be utilized, and
  as compounds of crosslinker class IV, $Al_2(SO_4)_3$ may be utilized.

In one aspect of the invention, the absorbent polymers are polymers which are crosslinked by crosslinkers of the following crosslinker classes or by crosslinkers of the following combinations of crosslinker classes respectively: I, II, III, IV, I II, I III, I IV, I II III, I II IV, I III IV, II III IV, II IV or III IV. The preceding combinations of crosslinker classes represent respectively exemplary embodiments of crosslinkers of a polymer.

Further embodiments of the absorbent polymers are polymers which are crosslinked by any of the crosslinkers disclosed in DE 102 23 060 A1 as crosslinkers of crosslinker classes I, whereby N,N'-methylene bisacrylamide, polyethyleneglycol di(meth)acrylates, triallylmethylammonium chloride, tetraallylammonium chloride and allylpolyethyleneglycol acrylate produced from 9 mol ethylene oxide per mol acrylic acid are utilized as crosslinkers of crosslinker class I.

The absorbent polymers can be produced from the above-named monomers and cross-linkers by various polymerization means known from the prior art. For example, in this context can be named bulk polymerization, which may occur in kneading reactors such as extruders or by belt polymerization, solution polymerization, spray polymerization, inverse emulsion polymerization and inverse suspension polymerization. Solution polymerization, according to the invention, may be carried out in water as solvent. The solution polymerization can occur continuously or discontinuously. From the prior art a broad spectrum of variation possibilities can be learnt with respect to reaction proportions such as temperatures, type and quantity of the initiators as well as of the reaction solution. Typical processes are described in the following patent specifications: U.S. Pat. No. 4,286,082, DE 27 06 135, U.S. Pat. No. 4,076,663, DE 35 03 458, DE 40 20 780, DE 42 44 548, DE 43 23 001, DE 43 33 056, DE 44 18 818.

As generally customary, the polymerization is started by use of an initiator. As initiators for initiation of the polymerization all initiators forming radicals under the polymerization conditions can be used, which are commonly used in the production of superabsorbers. An initiation of the polymerization by action of electron radiation on the polymerizable aqueous mixture is possible. The polymerization can also be started in the absence of initiators of the above type by action of energetic radiation in the presence of photoinitiators. The polymerization initiators may be dissolved or dispersed in a solution of monomers according to the invention. As initiators may be used all compounds known to the person skilled in the art that decompose to form radicals. Initiators and initiator quantities to be used are those initiators and quantities respectively which are cited in DE 102 23 060 A1 as initiators and quantities respectively.

A redox system comprising hydrogen peroxide, sodium peroxodisulfate and ascorbic acid, for example, is used according to one aspect of the invention. In general, according to the invention azo-compounds are used as initiators, such as azo-bis-amidinopropane dihydrochloride. As a rule the polymerization is initiated with the initiators in a temperature range from about 0° C. to about 90° C.

As water soluble polymers ($\alpha 4$), water soluble polymers such as those comprising partially or fully saponified polyvinyl alcohol, polyvinylpyrrolidone, starches or starch derivatives, polyglycols or polyacrylic acids may be polymerized into the water-absorbing polymer according to the invention. The molecular weight of these polymers is not critical, as long as they are water-soluble. Water-soluble polymers may be starches or starch derivatives or polyvinyl alcohol. The water-soluble polymers, such as synthetic like polyvinyl alcohol, can also serve as graft basis for the monomers to be polymerized.

As auxiliary ($\alpha 5$), suspension agents, odour binders, surface-active agents, or antioxidants may be comprised in the absorbent polymers. These auxiliaries ($\alpha 5$) may be added to the monomer solution before the polymerization, or mixed with the polymer after its production, whereby for the mixing, the mixing aggregates known to the skilled person can be used, e.g. the Patterson-Kelley mixer, DRAIS turbulence mixer, Lödige mixer, Ruberg mixer, snail mixer, plate mixer and fluidized bed mixer as well as continuously running vertical mixers in which the polymers and the auxiliary ($\alpha 5$) are mixed by means of rotating blades at fast frequency (Schugi mixer).

The gel granulate dried as a polymer cake in process step iii) has at least one of the following properties:
($\phi 1$) the maximum absorption of an about 0.9 wt. % aqueous NaCl solution according to ERT 440.1-99 lies within a range from about 10 g/g to about 1000 g/g SAP granulate,
($\phi 2$) the fraction that can be extracted with an about 0.9 wt % aqueous NaCl solution according to ERT 470.1-99 is less than about 30, based on the SAP granulate,
($\phi 3$) the bulk density according to ERT 460.1-99 lies within the range from about 300 to about 1000 g/l,
($\phi 4$) the pH value according to ERT 400.1-99 of about 1 g of the SAP granulate in about 1 liter of water is in the range from about 4 to about 10,
($\phi 5$) the CRC value according to ERT 441.1-99 lies within the range from about 10 g/g to about 100 g/g,
($\phi 6$) the AAP value at a pressure of about 0.3 psi according to ERT 442.1-99 lies within the range from about 10 g/g to about 60 g/g.

In another aspect of the invention, at least about 30, such as at least about 60 and such as at least about 80 wt. % of the absorbent polymer particles have a particle size within the range from about 150 µm to about 850 µm. According to an additional aspect of the present invention, the gel granulate is to at least about 50 wt %, such as at least about 75 wt % based on particles having a particle size in the range between about 300 µm and about 600 µm.

In additional aspects of the invention, in the context of the process according to the invention as well as in the context of the absorbent polymers obtainable by the process according to the invention, the values of features according to the invention given only with a lower limit have an upper limit which is about 20-fold, such as about 10-fold and such as about 5-fold the lower limit.

In another aspect of the invention, the absorbent polymers, such as polymer particles, obtainable by the process according to the invention have at least one of the following properties:
(A) maximum absorption of an about 0.9 wt % aqueous NaCl solution according to ERT 440.1-99 within a range from at least about 10 g/g to about 1000 g/g, such as about 15 g/g to about 500 g/g and such as about 20 g/g to about 300 g/g,
(B) the fraction that can be extracted with an about 0.9 wt % aqueous NaCl solution according to ERT 470.1-99 is less than about 30 wt %, such as less than about 20 wt % and such as less than about 10 wt %, based on the absorbent polymer,
(C) the bulk density according to ERT 460.1-99 lies within the range from about 300 to about 1000, such as about 310 g/l to about 800 g/l and such as about 320 g/l to about 700 g/l,
(D) the pH value according to ERT 400.1-99 of 1 g of the absorbent polymer in 1 liter of water lies within the range from about 4 to about 10, such as about 5 to about 9, and such as about 5.5 to about 7.5,
(E) the CRC value according to ERT 441.1-99 lies within the range from about 10 g/g to about 100 g/g, such as about 15 g/g to about 80 g/g, and such as about 20 g/g to about 60 g/g,
(F) the AAP value at a pressure of about 0.3 psi according to ERT 442.1-99 lies within the range from about 10 g/g to about 60 g/g, such as about 15 g/g to about 50 g/g and such as about 20 g/g to about 40 g/g.

The property combinations of two or more properties of the properties listed above represent respective exemplary embodiments of the polymer obtainable by the process according to the invention. Furthermore, exemplary embodiments according to the invention are processes in which the absorbent polymer obtained has the following properties or property combinations identified by letters or combinations of letter: A, B, C, D, E, F, AB, AC, AD, AE, AF, EF, ABC, ABD, ABE, ABF, ACD, ACE, ACF, ADE, ADF, AEF, CEF, ABCD, ABCE, ABCF, ABDE, ABDF, ACDE, ACDF, ACEF, ADEF, ACDEF, ABDEF, ABCEF, ABCDF, ABCDE, ABCDEF, particularly, combination CEF and combination EF.

In another embodiment of the process according to the invention, the outer portion of the absorbent polymer obtained by the process according to the invention, such as polymer particles, is brought into contact with a compound comprising an $Al^{3+}$ ion. In this case, for example, the compound comprising $Al^{3+}$ ions in a quantity within the range from about 0.01 to about 30 wt. %, such as in a quantity within a range from about 0.1 to about 20 wt. % and further such as within a range from about 0.3 wt % to about 5 wt %, respectively based on the weight of the absorbent polymer, is brought into contact with the polymers.

In this context the $Al^{3+}$ ion-containing compound is, for example, in the form of a fluid comprising a solvent, such as water, organic solvents which are miscible with water such as methanol or ethanol or a mixture of at least two of these solvents, and the $Al^{3+}$ ion-containing compound, is brought into contact with the polymer. The $Al^{3+}$ ion-containing compound, for example, is comprised in the fluid in a quantity, without taking into account water of crystallization, within a range from about 0.1 to about 50 wt. %, such as in a quantity within the range from about 1 to about 30 wt. %, respectively based upon the total weight of the fluid. In an additional aspect, the fluid in a quantity within a range from about 0.01 wt % to about 15 wt %, such as in a quantity within a range from about 0.05 to about 6 wt. %, respectively based on the weight of the absorbent polymer, is brought into contact with the absorbent polymer.

Exemplary $Al^{3+}$ ion-containing compounds are $AlCl_3 \cdot 6 H_2O$, $NaAl(SO_4)_2 \cdot 12 H_2O$, $KAl(SO_4)_2 \cdot 12 H_2O$, or $Al_2(SO_4)_3 \cdot 14\text{-}18 H_2O$.

In another aspect of the invention, the polymers, such as polymer particles, obtainable by the process according to the invention, have an inner region, an outer region surrounding the inner region and a surface region surrounding the outer region, whereby the outer region has a higher degree of crosslinking than the inner region, so that, for example, a core-shell structure is formed. Also, in this connection the radius of the outer region may be at least twice the radius of the inner region. The increased crosslinking in the surface region of the polymers, such as of the polymer particles, may be achieved by post-crosslinking of reactive groups in the area of the surface. This post-crosslinking can occur thermally, photochemically or chemically. As post-crosslinker for the chemical post-crosslinking, the compounds may be those mentioned as crosslinkers (α3) of crosslinker classes II and IV, such as ethylene carbonate.

The post-crosslinker may be used for post-crosslinking in an amount within a range from about 0.01 wt % to about 30 wt %, such as in a quantity within the range from about 0.1 wt % to about 20 wt %, such as in a quantity within a range from about 0.5 wt % to about 10 wt %, further such as in a quantity within a range from about 0.3 wt % to about 50 wt %, respectively based on the weight of the absorbent polymer used in the process according to the invention.

The post-crosslinking may occur by bringing into contact a post-crosslinking fluid comprising a solvent, such as water, organic solvents miscible with water such as methanol or ethanol or mixtures of at least two thereof, as well as the post-crosslinker, with the outer portion of the polymers, such as of the polymer particles, at a temperature within a range from about 30° C. to about 300° C., such as within a range from about 100° C. to about 200° C. The bringing into contact may occur by spraying the post-crosslinking fluid onto the polymers and then mixing the polymers which have been brought into contact with the post-crosslinking fluid. The post-crosslinker may be in the post-crosslinking fluid in a quantity within a range from about 0.01 wt % to about 20 wt %, such as in a quantity within a range from about 0.1 wt % to about 10 wt %, based on the total weight of the post-crosslinking fluid. In an additional aspect, the post-crosslinking fluid is in a quantity within a range from about 0.01 wt % to about 50 wt %, such as in a quantity within a range from about 0.1 wt % to about 30 wt %, respectively based on the weight of the polymers, is brought into contact with the polymers.

The absorbent polymers, such as polymer particles, crosslinked as described above, are referred to as "post-crosslinked polymers" or "post-crosslinked polymer particles" respectively. In another embodiment of the process according to the invention, the outer portion of the post-crosslinked polymers, such as polymer particles, is brought into contact with a compound comprising an $Al^{3+}$ ion. Concerning the compound comprising an $Al^{3+}$ ion, reference is made to the above details. The compound comprising an $Al^{3+}$ ion may be applied to the absorbent polymer in a fluid exactly as for the other above described post-crosslinkers and then likewise thermally treated.

The post-crosslinked polymer, such as polymer particles, has at least one, such as all of the following properties:

(N1) a CRC value determined according to ERT 441.1-99 within a range from about 20 g/g to about 40 g/g, such as within a range from about 25 g/g to about 35 g/g;

(N2) an AAP value determined according to ERT 442.1-99 at a pressure of 0.3 psi within a range from about 20 g/g to about 35 g/g, such as within a range from about 25 g/g to about 30 g/g;

(N3) an AAP value determined according to ERT 442.1-99 at a pressure of about 0.7 psi within a range from about 20 g/g to about 27 g/g, such as within a range from about 22 g/g to about 25 g/g.

Using the particular drying process, absorbent polymers with particularly uniform physical-chemical properties are prepared. The drying process allows an efficient production of absorbent polymers. The absorbent polymers according to the invention obtainable by the production process according to the invention are characterized by particularly uniform physical-chemical properties.

The invention also relates to a composite comprising the absorbent polymers according to the invention and a substrate. The absorbent polymers according to the invention and the substrate may be firmly combined with one another. As substrate may be sheets formed from polymers, for example from polyethylene, polypropylene or polyamide, metals, non-wovens, fluff, tissues, woven fabrics, natural or synthetic fibers, or other forms.

According to the invention, composites may be sealant materials, cables, absorbent cores as well as diapers and hygiene articles, such as sanitary napkins, containing these.

If the composite is an absorbent core comprising the absorbent polymer and a fiber material, absorbent polymer may be incorporated in an amount within the range from about 10 wt % to about 90 wt %, such as from about 20 wt % to about 80 wt % and such as from about 40 wt % to about 70 wt %, based on the core. In one embodiment of the core the absorbent polymer is incorporated as particles into the core. The polymer particles can be distributed homogeneously in the fiber material, they can be included in layers between the fiber material or the concentration of the absorbent polymer particles can have a gradient within the fiber material. In another embodiment of the core the absorbent polymer is incorporated into the core as fibers. In respect of the exact nature and structure of the absorbent core, reference is made to the details concerning this in U.S. Pat. No. 5,562,646.

The invention further relates to a process for producing a composite, whereby an absorbent polymer according to the invention, such as a polymer structure, and a substrate and optionally a suitable auxiliary are brought into contact with each other. The bringing into contact occurs, in particular if the composite is a core, such as by wet laid and air laid processes, compacting, extruding and mixing.

The invention additionally relates to a composite, which is obtainable by the above process.

The invention further relates to chemical products, in particular foams, formed bodies, fibers, sheets, films, cables, sealing materials, liquid-absorbing hygiene articles, for example diapers and sanitary napkins, carriers for plant or fungus growth regulating agents or plant protecting agents, additives for building materials, packaging materials or soil additives, which comprise the absorbent polymer according to the invention or the above described composite.

The invention additionally relates to the use of the absorbent polymer according to the invention or of the above-described composite in chemical products, in particular in foams, formed bodies, fibers, sheets, films, cables, sealing materials, liquid absorbing hygiene articles, for example diapers and sanitary napkins, in carriers for plant or fungus growth regulating agents or plant protection agents, additives for building materials, packaging materials or soil additives.

In the use as carriers for plant or fungus regulating agents or for plant protection agents, the plant or fungus growth regulating agent or the plant protection agent may be released over a period of time controlled by the carrier.

The device according to the invention for comminuting and drying a polymer according to the process according to the invention comprises a comminuting device for comminuting the undried polymer to a gel granulate, a loosening device for loosening the gel granulate and a drying device for the gel granulate, whereby the comminuting unit, the loosening unit and the drying unit are in communicating contact with each other. The undried polymerized polymer is comminuted with the help of the comminuting device. With the loosening device, the bulk density of the comminuted polymer, in particular of the gel granulate, is reduced by at least one, such as at least about 5, such as at least about 10, such as at least about 20 and such as at least about 30. With the drying device, the water content of the undried gel granulate is reduced.

Advantageously, the comminuting device comprises a cutting unit, a ripping unit and a "wolf" (grinding) unit. The absorbent polymer is cut with the help of the cutting unit. With the help of the ripping unit, the polymerized polymer is torn up, i.e. loaded under tension. With the help of the wolf unit, the polymerized polymer is crushed. By the combination of these three types of comminution, a gel granulate is obtained which is particularly advantageous to dry. Advantageously, the loosening unit is a rotating drum, such as a drum, such as a drum rotation mixer. With the help of the drum rotation mixer, the average bulk density of the gel granulate, in particular the undried gel granulate, is reduced. The loosening effects advantageously a spread behaviour of the gel granulate.

The present invention also relates to a polymerization device comprising
- a monomer solution container with a monomer solution conduit,
- an initiator container with an initiator conduit,
- a polymerization area,
- a device according to the invention for comminuting and drying a polymer,
- whereby the monomer solution conduit and the initiator conduit are attached to an entry area of the polymerization area and the device for drying of a polymer is arranged at an exit area.

As monomer solution container, are considered all containers known to the skilled person, such as plastic or steel tanks The same is the case for the initiator container. The conduits may be made from materials such as plastic or steel which are inert to the monomers or the initiators. As polymerization area, kneading or belt polymerization reactors may be used, particularly the latter. Absorbent polymers which are particularly suitable for further processing by means of the process according to the invention can be obtained from belt polymerization reactors. In addition, belt polymerization reactors allow a continuous flow of the process according to the invention. In knead reactors, worm shafts are used as conveying means and in band polymerization reactors, one or more conveyor belts or adjacently arranged monomer solution- and initiator accepting forms are used, such as a conveyor belt forming a depression.

The process according to the invention for producing an absorbent polymer is characterized by a spread behavior of the gel granulate after step ii). The production process of an absorbent polymer is distinguished by a particularly efficient drying step iii), which enables a particularly gentle and even drying of the gel granulate. The thus obtained absorbent polymers and the products and items produced therefrom have a particularly uniform product quality and constant physical-chemical properties.

Further details and advantages of the invention are more closely described by means of the following description of the figures and examples. It is shown schematically:

FIG. 2a-2f shows the device for determination of the compressibility and decompressibility indices respectively; FIG. 2b shows the disk of the piston in a view from above, FIG. 2c the entire piston in a side view, FIG. 2d the gel particles situated in the cylindrical vessel before the introduction of the piston, FIG. 2e the gel particles loaded with the piston in the cylindrical vessel, which were compressed by distance x and FIG. 2f the decompressed gel particles inside the cylindrical vessel;

FIG. 3 shows the procedure for determination of the cross section spread index Q and of the spread time constant τ.

Figure 1:
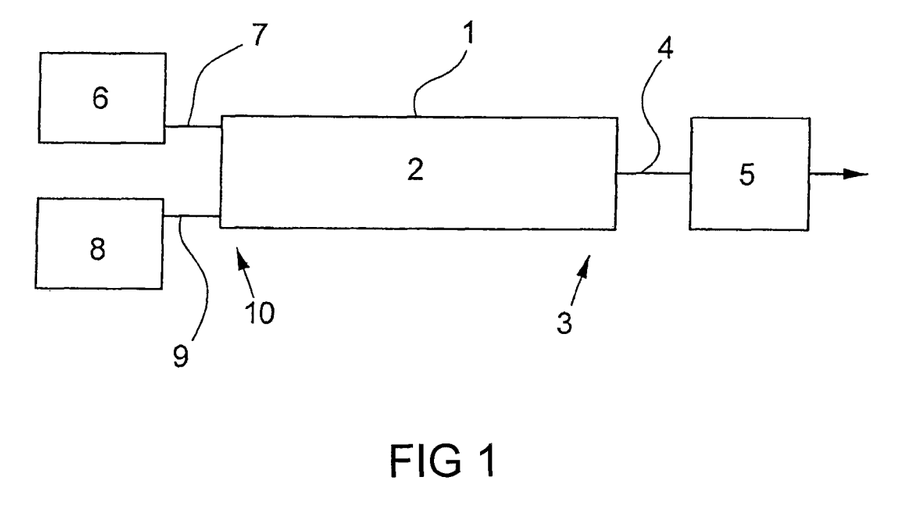
FIG. 1 is a schematic representation of a polymerization device with a device for drying of a polymer.

In FIG. 1 is given a schematic representation of a polymerization device 1 with a polymerization area 2, whereby the polymerization area 2 at its exit area 3 is linked via a compound conduit 4 with a device 5 for drying of a polymer. A monomer solution container 6 is connected via a monomer solution conduit 7 and an initiator container 8 is connected via an initiator conduit 9 with the entry area 10 of the polymerization area 2.

A more exact description of FIGS. 2 to 6 follows in conjunction with the test methods and the examples.

Test Methods

ERT Methods

The ERT methods are those developed by EDANA (European Non-woven and Diaper Association), which are applied here unless otherwise described.

The determination of the first and second compressibility index $\kappa_1$ and $\kappa_2$ respectively, the determination of the first and second decompressibility index $\kappa_1'$ and $\kappa_2'$ respectively, and the determination of the cross section spread index Q and of the spread time constant τ is carried out at the temperature which the gel particles whose spread behaviour should be determined have at the time of determining the spread behaviour. Gel particles for which the above named parameters cannot be determined by means of the following described measurement process do not count as gel particles preferred according to the invention.

First $\kappa_1$ and Second $\kappa_2$ Compressibility Index

The determination of the first and second compressibility indices ($\kappa_1$ and $\kappa_2$ respectively) was carried out according to the measurement device represented in FIGS. 2a to 2g.

For a determination of the first and second compressibility indices, a cylindrical vessel 11 open to the top with a volume of about 2 litres comprising a cylindrical jacket 12 made from Plexiglas with an outer diameter of about 120 mm, an inner diameter of about 110 mm, a wall thickness of about 5 mm and an inner cross-sectional area of about 9503 mm² and a circular bottom 13 made from Plexiglas with a diameter of about 130 mm and a thickness of about 6 mm (see FIG. 2a) is used. The cylindrical jacket 12 is fixed centrally on the circular bottom 13.

Figure 2A:
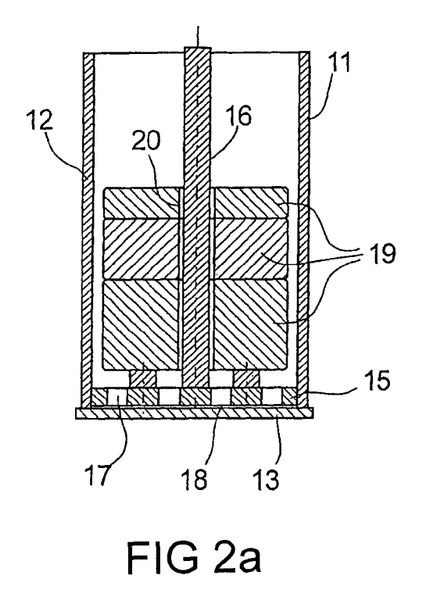
FIG. 2a shows the cylindrical vessel into which the piston (with all additional weights) was introduced (without gel granulate in the vessel) in a side view.
Figure 2B:
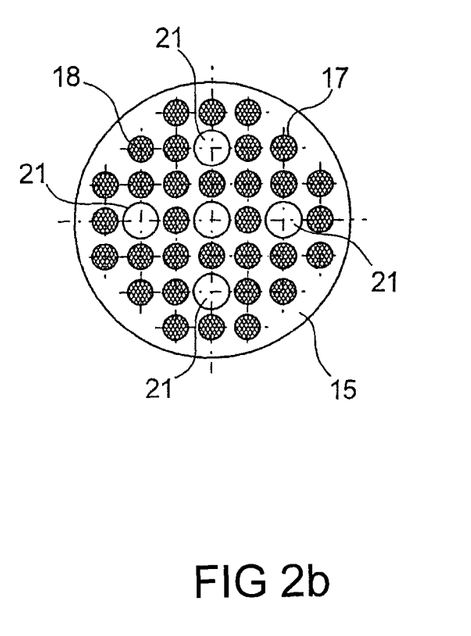
Figure 2C:
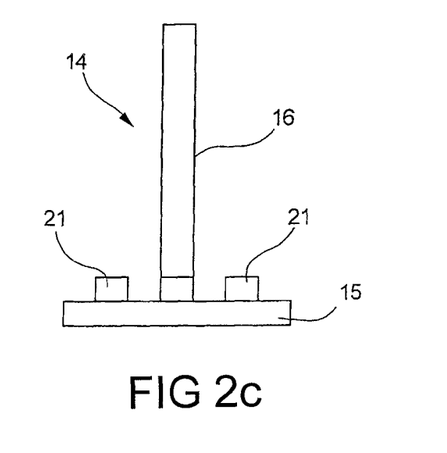

A piston 14 made from polypropylene having a disk 15 with a thickness of about 12 mm and a rod 16 with a diameter of about 19.5 mm and a length of about 190 mm, which is fixed centrally on the disk 15 (see FIGS. 2a and 2c) can be introduced into the cylindrical vessel 11. The diameter of the disk 15 is selected so that the disk 15 and thus the piston 14 can glide without friction in the cylindrical vessel 11. The mass of the piston $m_{piston}$ amounts to about 190 g. The disk 15 has a total of 32 holes 17 with a diameter of about 9.5 mm and an arrangement as represented in FIG. 2b. Upon introducing the piston 14, the air in the cylindrical vessel which is beneath the disk 15 should be able to escape through the holes. On the side of the disk 15 facing away from the rod 16 is attached centrally a circular sieve 18 made from stainless steel with a mesh size of about 50 μm and with a diameter which corresponds to the diameter of the disk 15. The sieve 18 thus forms the bottom of the holes 17 in the disk 15. The sieve 18 should prevent gel material being pressed through the holes 17 upon compressing the gel granulate through the piston 14. The piston 14 can be loaded with different additional masses 19 with mass$_i$. The additional masses 19 are disk-shaped bodies made from steel with a diameter of about 100 mm and a thickness between about 17 mm and about 50 mm (depending on the mass $m_i$ of the additional weight). The additional weights have furthermore in the centre a hole 20 with a diameter of about 19.5 m. Using this hole 20 it is possible to fix the additional masses 19 onto the piston 14 by passing the rod 16 through the hole 20, as shown in diagram 2a. The total mass $m_{tot}=m_{piston}+m_i$ of the piston 14 with the additional masses 19 should be selectable between about 1 kg and about 6 kg. The disk 15 of the piston 14 further has for small, cylindrical elevations 21 with a diameter of about 15 mm and a height of about 10 mm, the arrangement of which on the disk 15 is shown in FIG. 2b. By means of the elevations 21 it is prevented that the additional weights 19 come to lie directly on the disk 15 (see FIG. 2a), since this would lead to closing of the holes 20 with the result that upon introduction of the piston 14 into the cylindrical vessel 11 no more air can escape from the vessel.

Figure 2D:
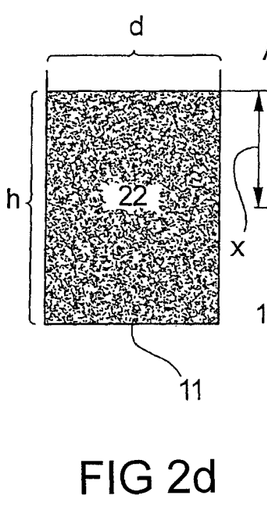
Figure 2E:
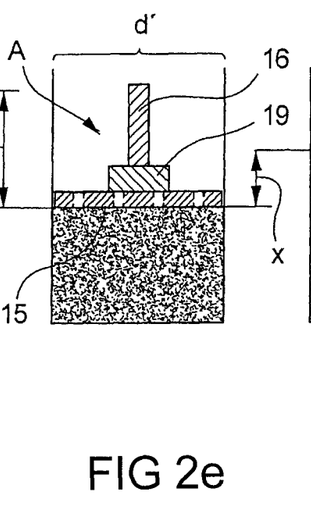
Figure 2F:
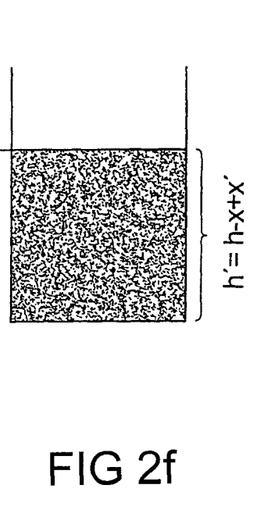

After the cylindrical vessel 11 and the piston 14 together with the first used additional weight 19 have been pre-warmed to the temperature of the gel particles whose spread behaviour should be determined (for example by means of a corresponding temperature-controlled incubator), the vessel 11 is filled to an average fill height h of h=about 150 mm with the gel granulate 22 of an absorbent polymer whose spread behaviour should be determined (see FIG. 2d). Directly after the filling, the pre-warmed piston 14 with the respective additional weight 19 is introduced into the vessel 11 until it presses down on the gel granulate 22. The time is noted at which the piston 14 with its total mass (mass of the piston plus mass of the additional weight) first touches the gel particles 22. 15 seconds after this point of time the compression distance x (in mm), by which the gel granulate 22 under the weight of the piston 14 is pressed together, is measured (see FIG. 2e).

The piston 14 and the gel granulate 22 are then removed from the cylindrical vessel 11 and the vessel 11 as well as the piston 14 are again pre-warmed to the temperature of the gel particles to be investigated. New gel granulate is placed in the vessel 11 up to an average fill height h of h=about 150 mm and the piston 14 with a second (e.g. heavier in comparison to the first total mass) total mass is again introduced carefully into the vessel 11 and after 15 seconds the compression distance x (in mm), by which the gel granulate has been pressed together unto the weight of the piston 14, is measured again. In this way the respective compression distances for the remaining total masses are determined. From the respective compression distances x and the fill height (about 150 mm) a respective normalized volume reduction for each total mass is determined as a percentage, given by $\Delta V/V_0 = x/h$. The normalization is based on the original, uncompressed volume $V_0$. From the respective total masses $m_{tot}$ and the inner cross-sectional area A' of the cylindrical vessel 11, the compression pressure Δp for the respective total masses is determined $\Delta p = m_{tot} \cdot 9.81 \, m/s^2/A$. The normalized volume reduction $\Delta V/V_0$ for the different total masses is plotted in a grass against the respective compression pressure Δp. A regression line, which is determined using a linear regression, is drawn through the values of the normalized volume reduction. The linear regression is determined for compression pressures in the interval between about 1000 Pa and about 7000 Pa. The gradient of the regression line is the second compressibility index $\kappa_2$. The offset of the line is the first compressibility index $\kappa_1$ (see FIG. 4).

First $\kappa_1'$ and Second $\kappa_2'$ Decompressibility Index

The decompression experiment follows the compression experiment. The same measurement device is used as for the determination of the compression experiments.

The gel granulate 22 is first compressed as described under the weight of a piston 14 which has a first total mass and then decompressed, i.e. relaxed. This occurs when the piston 14 with the additional mass $m_i$ is removed from the gel granulate 22. Through the thus affected release, the compressed gel granulate relaxes by a decompression distance x' (in mm) (see FIG. 2f). It is proceeded in such a way that the gel granulate 22 is placed in the vessel 11 which has been pre-warmed to the temperature of the gel granulate up to an average fill height h of about 150 mm and directly after the filling of the likewise pre-warmed piston 14 together with the additional weight 19 is introduced into the vessel 11. After the piston 14 has pressed on the gel granulate 22 for 15 seconds, the piston 14 is removed and a further about 15 seconds after removal of the piston 14, the decompression distance x' is determined (see FIG. 2O. The gel granulate 22 is then removed from the cylindrical vessel 11, new gel granulate 22 is placed in the vessel 11 which has been pre-warmed again up to an average fill height h of h=about 150 mm. The piston 14 with a second (e.g. heavier compared to the first total mass) total mass carefully introduced into the vessel 11, so that the gel granulate 22 is compressed. After removal of the piston 14, the gel granulate 22 is decompressed and 30 seconds after removal of the piston 14, the decompression distance x' (in mm) corresponding to the second total mass is measured. In this way, the respective decompression distances for all remaining total masses are determined. From the respective decompression distances, a normalized volume increase $\Delta V'/V1$ (unit: percent) by $\Delta V'/V1 = x'/(h-x)$ determined respectively for the respective total masses. The normalization here is based on the volume V1 compressed previously by the piston 14. The normalized volume increase $\Delta V'/V1$ is plotted against the compression pressure release $\Delta p' = m_{tot} \cdot 9.81 \text{ m/s}^2/A$ in the range of values between about 1000 Pa and about 7000 Pa. A regression line, determined by linear regression, is drawn through the points. The second decompressibility index $\kappa_2'$ is the gradient of the regression line. The first decompressibility index $\kappa_1'$ is the offset of the line (see FIG. 5).

Cross Section Spread Index Q and the Spread Time Constant τ

The cross section spread index Q and the spread time constant τ are determined by a so-called putting-over-experiment. To this end, a device is used which corresponds to the device described in the context of the determination of the compression and decompression index respectively, but with the difference that the cylindrical vessel 11 has no circular bottom 13 and is thus open to the downside.

For the determination of the cross section spread index Q and of the spread time constant τ, the cylindrical vessel 11 is placed on a flat substrate plate 24 made from polypropylene, so that this substrate plate 24 forms the bottom of the cylindrical vessel 11. The cylindrical vessel 11 and the substrate plate 24 have been previously pre-warmed to the temperature of the gel particles whose spread behaviour should be determined. The gel particles are then placed in the cylindrical vessel 11 to an average fill height of about 150 mm and directly afterwards the likewise pre-warmed piston 14 together with a first, likewise pre-warmed additional weight 19 placed on the gel particles. About 30 seconds later, the piston 14 is removed from the cylindrical vessel and the cylindrical vessel is lifted so that a cylindrical pressling 23 of gel particles remains on the substrate plate 24 (see FIG. 3a).

Figure 3A:
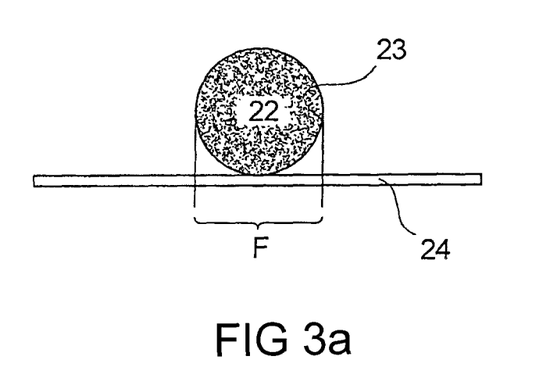
FIG. 3a shows the pressling of gel particles directly after the removal of the cylindrical vessel from above and FIG. 3b the "run" pressling in cross section.
Figure 3B:
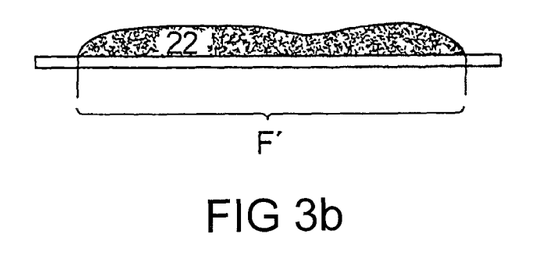

In this experiment, the spread behaviour is shown in that the pressling 23 is no longer held in shape as soon as the cylindrical vessel 11 is lifted and distributes itself over a comparably large area of the substrate plate 24 (see FIG. 3b). The distribution of the gel granulate on the level surface takes a few seconds. The spread behaviour of the gel granulate or of the loosened gel granulate is determined by a spread time constant τ. The spread time constant τ is determined by the time which elapses until the gel granulate shaped into a cylindrical pressling ends its spread movement, after which the pressling is no longer held in shape. The cross section spread index is determined in that after the end of the spread movement (the spread movement is ended when at an arbitrary boundary point of the spread pressling within a time interval of about 30 seconds no further spreading can be observed with the eye) the area covered by the gel granulate (=F') is determined. The cross section spread index is defined as follows: Q=F'/F, whereby F is the cross-sectional area of the pressling before the raising of the cylindrical vessel 11 (F=9503 mm$^2$).

COMPARATIVE EXAMPLE

Composition (Amounts in Kg for Input 1)

| | |
|---|---|
| 4000.0 | water |
| 2030.0 | 50% sodium hydroxide |
| 2610.0 | acrylic acid |
| 105.0 | methoxypolyethylene glycol (17 EO) methacrylate |
| 15.7 | polyethyleneglycol (10 EO) allyletheracrylate |
| 8760.7 | monomer solution for input 1 |

About 400 kg/h of this monomer solution are cooled in a heat exchanger to about 1° C. and freed from dissolved oxygen to a residual content of about 0.9 ppm in a stripper with a throughflow of about 3 m$^3$/h nitrogen. The following solution quantities were mixed with this input 1 before feeding onto the polymerization belt:

input about 2:8.8 l/h 0.75% sodium peroxodisulfate solution input about 3:8.8 l/h 2,2'-azobis(2-methylpropionamidine) dihydrochloride input about 4:8.8 l/h 0.5% hydrogen peroxide solution input about 5:8.8 l/h 0.075% ascorbic acid solution input about 6:10 kg/h of a solution of about 15 kg polyethyleneglycol-400 dimethacrylate in about 200 kg water.

After a dwell time of about 40 minutes, the solid, still hot polymer gel, is comminuted using a "Fleischwolf" (meat grinder) to a gel particle size within a range of about 150 μm to about 3000 μm (pre-comminution) and dried on a belt dryer in zone 1 and 2 at about 160° C., zone 3 with about 140° C. and zone 4 and 5 with about 130° C. delivery air temperature. The dried gel granulate is then ground on a cutting mill attached after the belt dryer. The power consumption of the cutting mill during the grinding is seen in the diagram shown on FIG. 6 (see the right half of the diagram in FIG. 6: power consumption "without gel loosening").

Example 1

The comparative example is repeated. After the gel comminution and before the drying on the belt dryer the gel particles are loosened in a drum (length: about 300 cm, diameter: about 80 cm), which turns with a speed of about 7.1 rotations per minute about the longitudinal axis, from about 2 to about 3 minutes. The drying and grinding of the gel then follows, as was described in the comparative example. The power consumption of the cutting mill during the grinding is shown in the diagram depicted in FIG. 6 (see left half of the diagram in FIG. 6: power consumption "with loosening"). It can be seen from FIG. 6 that the loosening of the gel particles before the drying leads to a noticeable reduction in the power consumption of the cutting mill with which the dried gel particles are ground.

Example 2

The spread behaviour is determined for the gel particles obtained in example 1 after the loosening and before the drying, which have a temperature of about 62° C.

Compression and Decompression Behaviour:

In the compression/decompression experiments it is seen that the compression movement is stronger than the decompression movement (i.e. the value of the compression distance x is larger than the decompression distance x'). In the following Table 1, are represented respectively two experimentally obtained values for an original fill height h=about 150 mm:

TABLE 1

| Total mass [g] | Compression distance x [mm][1)] | Decompression distance x˙ [mm][1)] |
|---|---|---|
| 1185 | 30 | 16 |
| 2175 | 50 | 22 |
| 3185 | 53 | 35.5 |
| 6185 | 66 | 35 |

[1)]Average value from 5 measurements

Cross Section Spread Index Q and Spread Time Constant τ

The results of an experiment to determine the cross section spread index and to determine the spread time constant τ of the thus loosened gel particles are represented in the following Table 2. In addition to the area F' the average height h' of the pressling after the end of the spread movement is also determined. The determination of the spread area was carried out by using graph paper which was laid under the transparent substrate plate.

TABLE 2

| Total mass [g] | Area F˙ [mm$^2$][1)] | Height h˙ [mm][1)] |
|---|---|---|
| 1185 | 74375 (Q = 7.8) | 40 |
| 2175 | 71375 (Q = 7.5) | 35 |
| 3185 | 68750 (Q = 7.2) | 35 |
| 6185 | 62500 (Q = 6.6) | 32 |

[1)]Average value from 5 measurements

Figure 4:
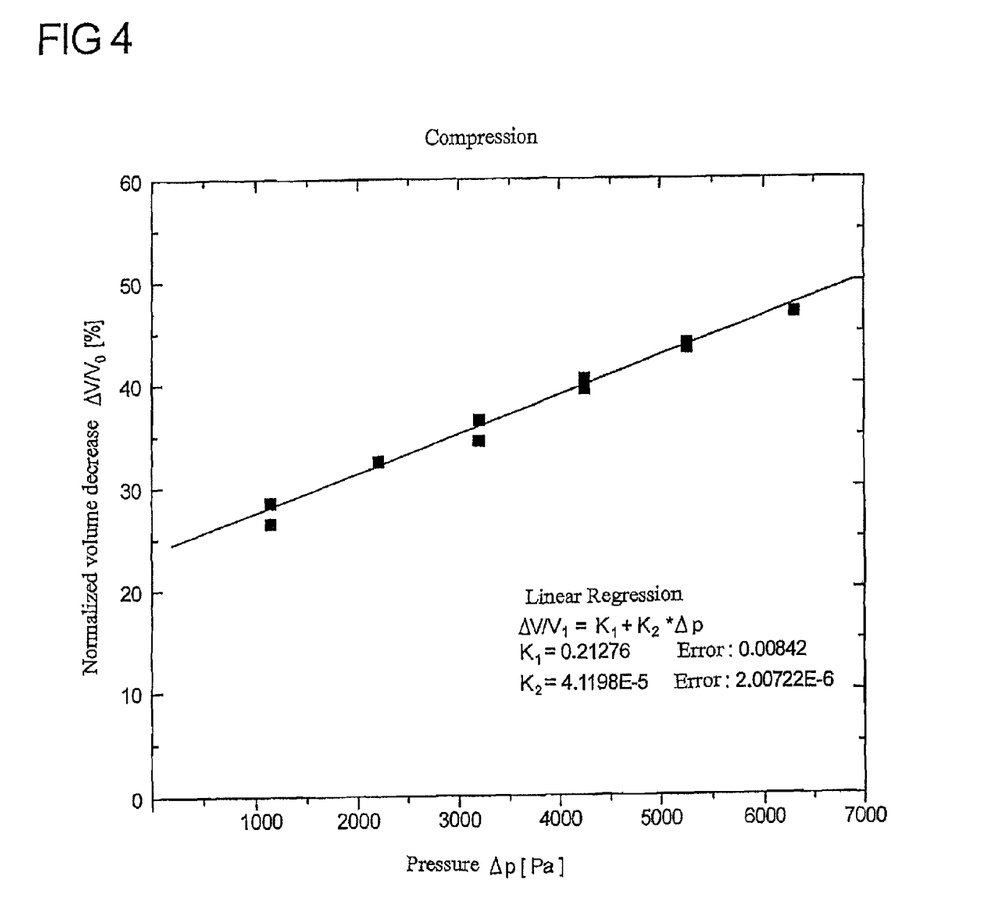
FIG. 4 shows a plot of a measurement result in a compression experiment.

In FIG. 4, the normalized volume reduction caused by the compression is plotted against the compression pressure. A regression line was drawn through the measured points. The gradient of the line is about $4.12 \times 10^{-5}$ Pa$^{-1}$. The offset of the line is about 21%.

Figure 5:
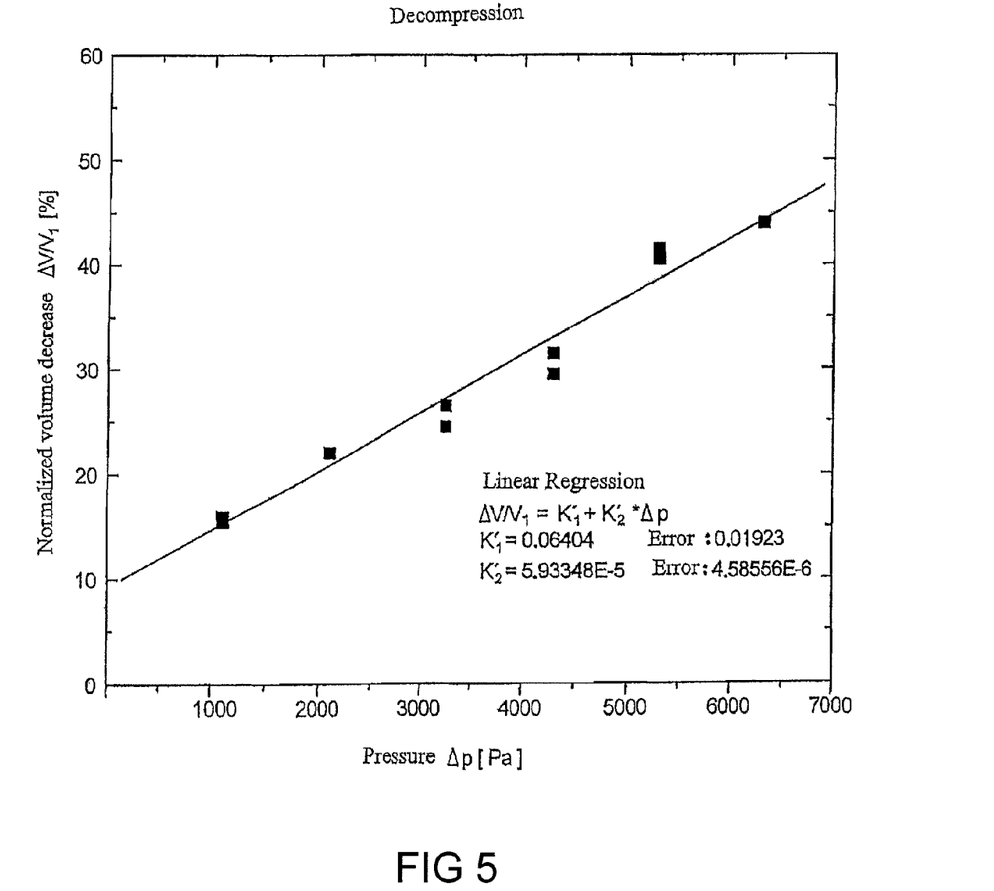
FIG. 5 shows a plot of a measurement result in a decompression experiment.

In FIG. 5, the normalized volume increase is plotted against the decompression pressure. A regression line is drawn through the measured values. The gradient of the line is about $5.9 \times 10^{-5}$ Pa$^{-1}$; the offset of the line is about 6.4%. It can be seen that the decompression, i.e. after removal of the piston 11 with the additional masses 19, is less strong than the compression. In particular, the compression differs from the decompression by different offsets, whereas the gradients of the regression line within the measurement error bars are the same.

Figure 6:
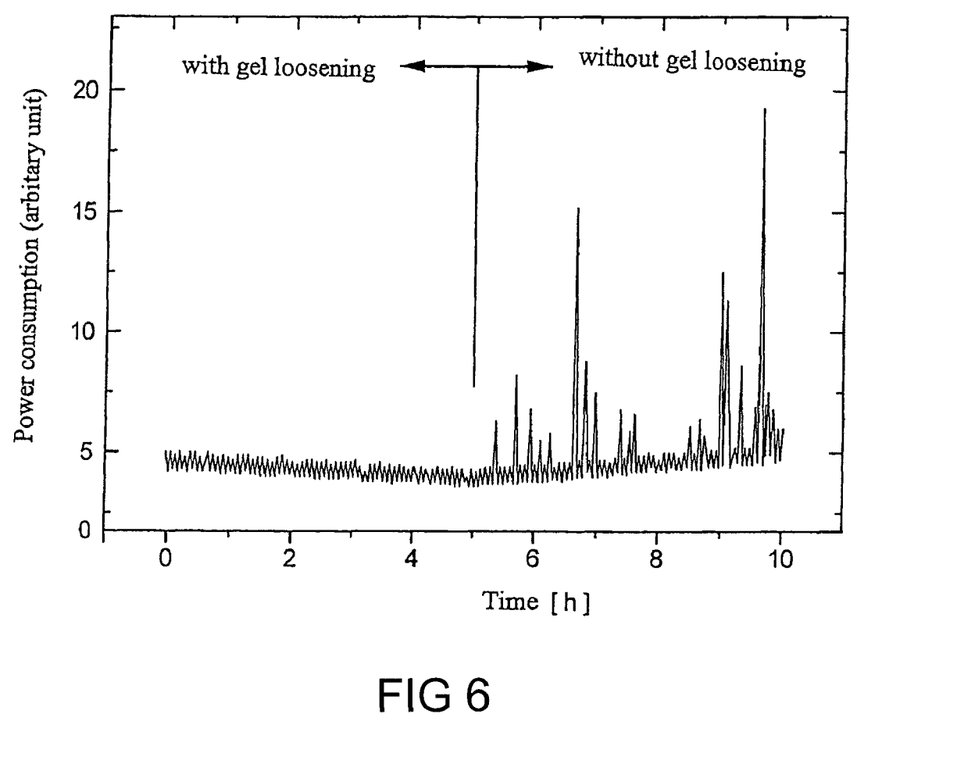
FIG. 6 is a representation of the power consumption of the cutting mills with and without loosening of the gel particles before the drying.

FIG. 6 shows the power consumption of the cutting mill with and without the process according to the invention, i.e. with and without loosening of the gel particles. The cutting mill is connected after the device for drying 5 and serves to comminute the dried polymer.

The cutting mill connected after the belt dryer shows, as a sign of a homogenous drying as a result of the loosening carried out before the drying, a uniform electricity/power consumption.

LIST OF REFERENCE NUMERALS 1 polymerization device
2 polymerization area
3 exit area
4 compound conduit
5 device for drying
6 monomer solution conduit
7 monomer solution container
8 initiator container
9 initiator conduit
10 entry area
11 cylindrical vessel
12 cylindrical jacket
13 circular bottom
14 piston
15 disk
16 rod
17 hole in the disk 15
18 sieve with a mesh size of 50 μm
19 additional masses
20 hole in the additional masses
21 elevation
22 gel granulate
23 pressling made from gel granulate
d in a diameter of the cylindrical vessel 11
d' outer diameter of the piston 14
A' inner cross-sectional area of the piston 14
x compression distance
x' decompression distance
h fill height of the gel granulate 22 in the vessel 11 before the compression experiment
h' final fill height of the gel granulate 22 in the vessel 11 after decompression experiment
F cross-section area of the pressling
F' area of the "flowed" pressling on the substrate plate after spreading

What is claimed is:

1. An absorbent polymer granulate obtained by the process comprising the steps of:
  i) polymerizing an aqueous monomer solution to obtain a polymer gel,
  ii) comminuting the polymer gel to obtain a polymer gel granulate, and
  iii) obtaining a mechanically loosened polymer gel granulate by loosening the polymer gel after the comminution in step ii), in the form of the polymer gel granulate obtained after the comminution; and
  iv) drying the polymer gel granulate;
  wherein the polymer gel granulate after step ii) has a spread including a first compressibility index $\kappa_1$ of the gel granulate that lies between about 10% and about 40%; and
  wherein the spread behavior of the gel granulate after step ii) is characterized by at least one of the following features
    (δ1) a second compressibility index $\kappa_2$ of the gel granulate lies between about $3 \cdot 10^{-5}$ Pa$^{-1}$ and about $6 \cdot 10^{-5}$ Pa$^{-1}$; or
    (δ2) a first decompressibility index Kr of the gel granulate lies between about 3% and about 15%; or
    (δ3) a second compressibility index $\kappa_2$' of the gel granulate lies between about $3 \cdot 10^{-5}$ Pa$^{-1}$ and about $7 \cdot 10^{-5}$ Pa$^{-1}$.

2. The absorbent polymer granulate according to claim 1, wherein the spread behavior of the gel granulate or of the loosened gel granulate after step ii) is characterized by a cross section spread index Q of at least about 3 with a load with a total mass of about 1185 g.

3. The absorbent polymer granulate according to claim 1, wherein the spread behavior of the gel granulate or of the loosened gel granulate after step ii) is determined by a spread time constant $\tau$ of at least about 2 s with a load with a total mass of about 6185 g.

4. The absorbent polymer granulate according to claim 1, wherein the density of the undried gel granulated after step ii) is less than about 0.7 g/cm$^3$.

5. The absorbent polymer granulate according to claim 1, wherein the gel granulate in step ii) is subjected to an at least three-step comminution with a cutting unit, a ripping unit and a "wolf" grinding unit.

6. The absorbent polymer granulate according to claim 1, wherein the polymer gel granulate comprises at least about 10 wt. %, based on the gel granulate, an absorbent polymer based upon:
($\alpha$1) from about 0.1 to about 99.999 wt. % of polymerized, ethylenically unsaturated, acidic groups-comprising monomers or salts thereof, or polymerized, ethylenically unsaturated monomers comprising a protonated or a quaternary nitrogen, or mixtures thereof,
($\alpha$2) from 0 to about 70 wt. % of polymerized, ethylenically unsaturated monomers which can be co-polymerized with ($\alpha$1),
($\alpha$3) from about 0.001 to about 10 wt. % of one or more cross-linkers,
($\alpha$4) from 0 to about 30 wt. % of water-soluble polymers, as well as
($\alpha$5) from 0 to about 20 wt. % of one or more auxiliaries, respectively based on the dry absorbent polymer, wherein the sum of the component weights ($\alpha$1) to ($\alpha$5) amounts to 100 wt. %.

7. The absorbent polymer granulate according to claim 1, wherein the dried gel granulate has at least one of the following properties:
($\phi$1) the maximum absorption of a 0.9 wt. % aqueous NaCl solution lies within a range from about 10 to about 1000 g/g SAP granulate,
($\phi$2) the fraction that can be extracted with a 0.9 wt. % aqueous NaCl solution is less than about 30, based on the SAP granulate,
($\phi$3) the bulk density lies within the range from about 300 to about 1000 g/l,
($\phi$4) the pH value of about 1 g of the SAP granulate in about 1 liter of water is in the range from about 4 to about 10,
($\phi$5) the CRC value lies within the range from about 10 to about 100 g/g,
($\phi$6) the AAP value at a pressure of about 0.3 psi lies within the range from about 10 to about 60 g/g.

8. A composite comprising absorbent polymer granulates according to claim 1, and a substrate; wherein said absorbent polymer granulates and said substrate are brought into contact with one another.

9. The composite according to claim 8, wherein an optional auxiliary is brought into contact with said absorbent polymer granulates and said substrate.

10. The absorbent polymer granulate according to claim 1, wherein process steps ii) and iii) of the process are carried out using a device comprising a comminution device for comminution of the undried polymer to a polymer gel granulate, a loosening device for loosening for the gel granulate and a drying device for the gel granulate, wherein the comminution device, the loosening device and the drying unit are in communicating contact with each other.

11. The absorbent polymer granulate according to claim 10, wherein said comminution device comprises a cutting unit, a ripping unit, and a "wolf" (grinding) unit.

12. The absorbent polymer granulate according to claim 10, wherein said loosening unit is a rotating drum.

13. The absorbent polymer granulate according to claim 1, wherein said process further comprises a polymerization device comprising:
a monomer solution container with a monomer solution conduit,
an initiator container with an initiator conduit, and
a polymerization area,
wherein at an entry area of the polymerization area the monomer solution conduit and the initiator conduit are attached and at an exit area a device for carrying out process steps ii) and iii) is arranged;
wherein said device for carrying out process steps ii) and iii) comprises a comminution device for comminution of the undried polymer to a polymer gel granulate, a loosening device for loosening for the gel granulate and a drying device for the gel granulate, wherein the comminution device, the loosening device and the drying unit are in communicating contact with each other.

* * * * *

UNITED STATES PATENT AND TRADEMARK OFFICE
CERTIFICATE OF CORRECTION

| | | |
|---|---|---|
| PATENT NO. | : 7,863,338 B2 | |
| APPLICATION NO. | : 12/762779 | |
| DATED | : January 4, 2011 | |
| INVENTOR(S) | : Volker Becker et al. | |

It is certified that error appears in the above-identified patent and that said Letters Patent is hereby corrected as shown below:

Column 20,

Line 59, "decompressibility index Kr of the gel" should read -- decompressibility index $K_1'$ of the gel --.

Signed and Sealed this
Twenty-second Day of February, 2011

David J. Kappos
*Director of the United States Patent and Trademark Office*